May 12, 1959
J. E. SOLECKI
2,886,164
CONVEYORS
Filed Oct. 8, 1954
3 Sheets-Sheet 1
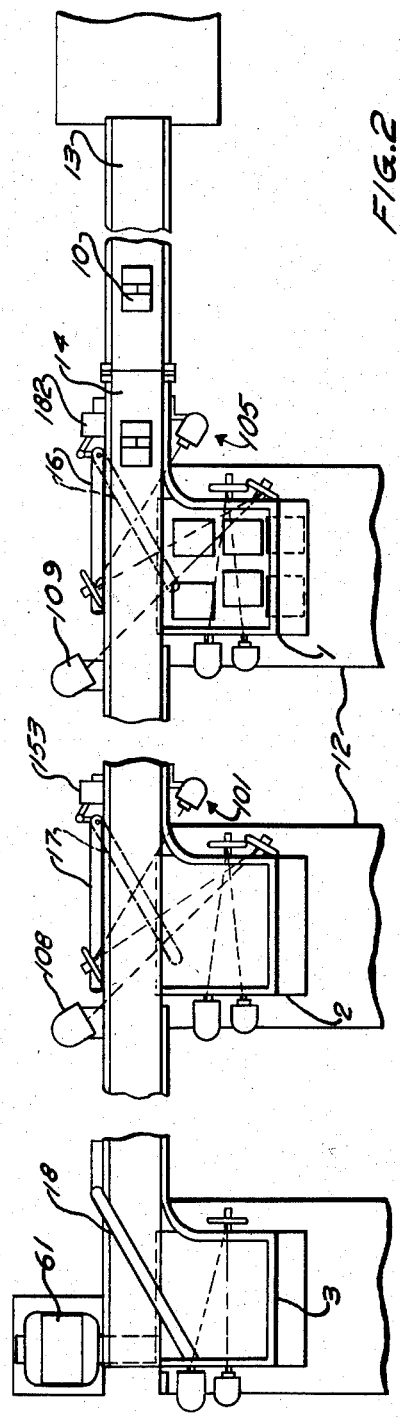
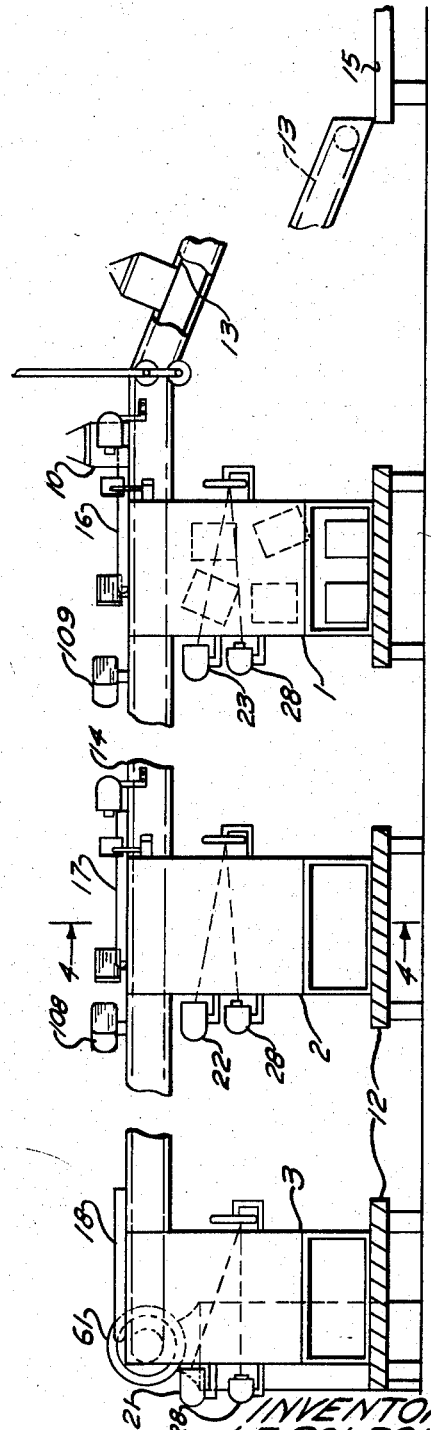
INVENTOR
J.E. SOLECKI
BY C. B. Hamilton
ATTORNEY

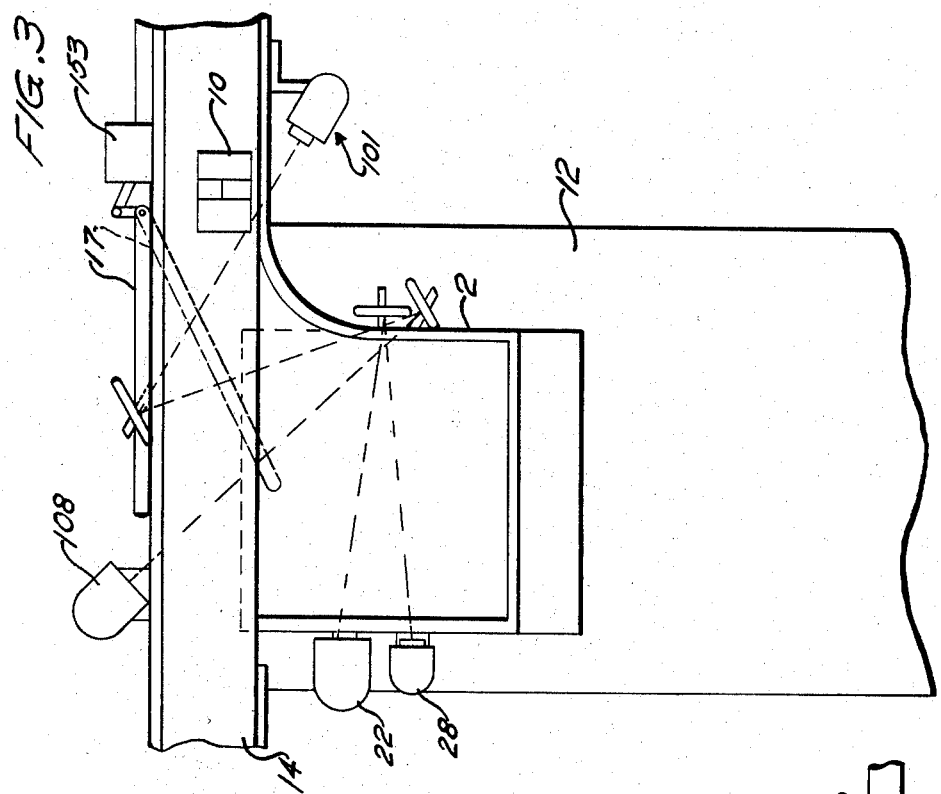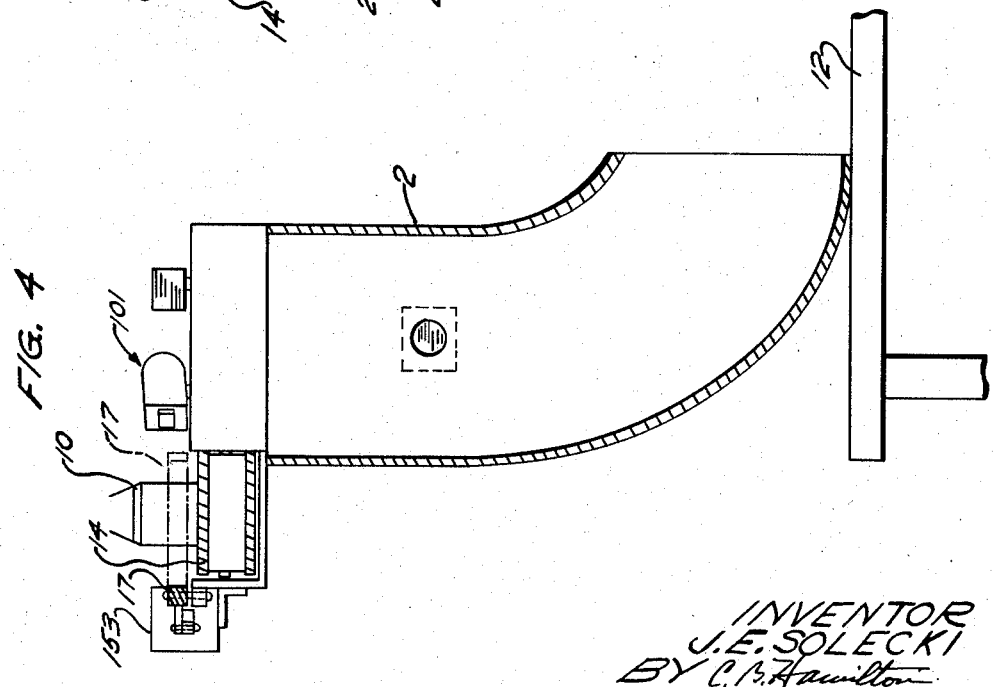

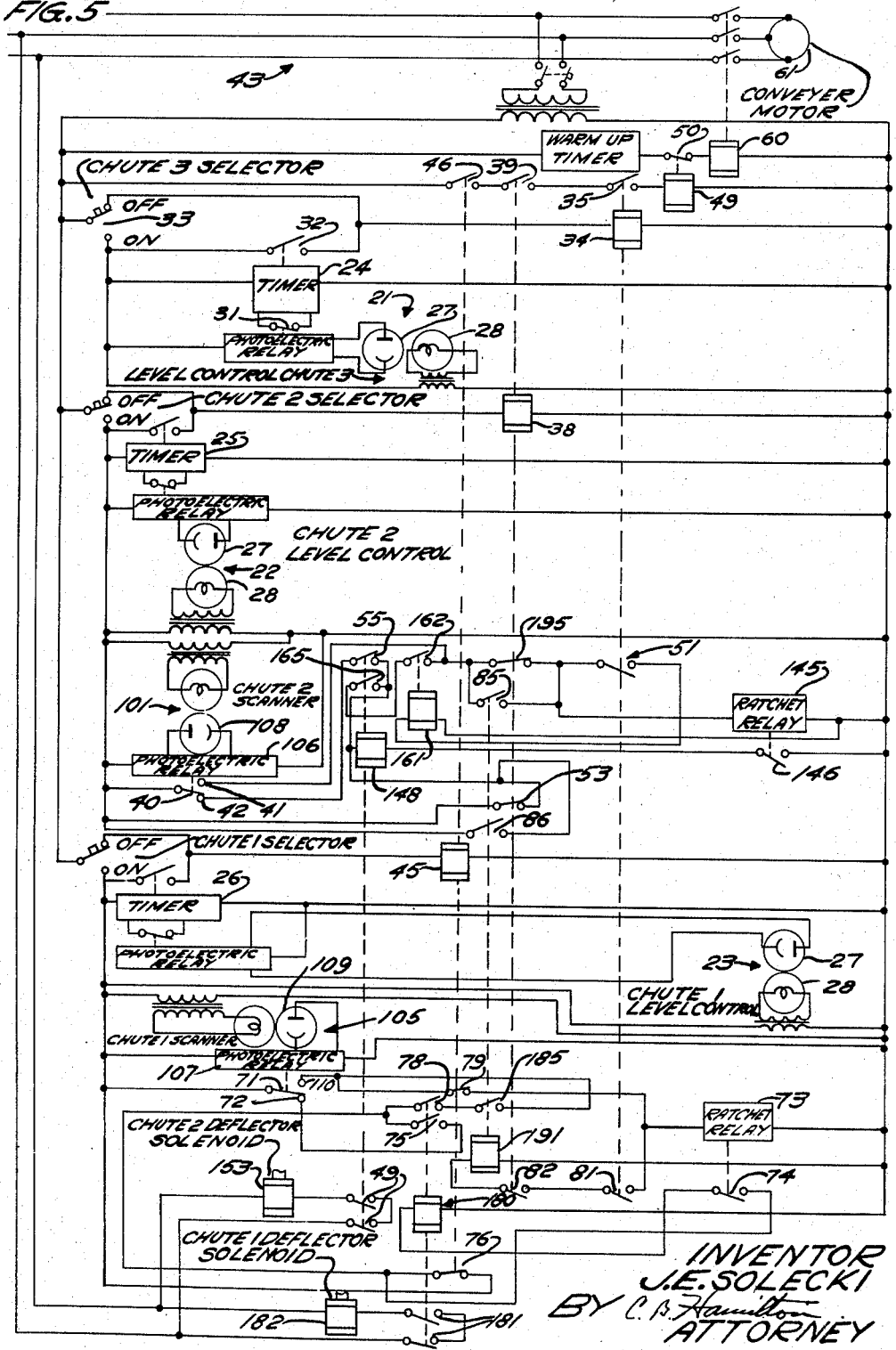

United States Patent Office 2,886,164
Patented May 12, 1959

2,886,164

CONVEYORS

John E. Solecki, Indianapolis, Ind., assignor to Western Electric Company, Incorporated, New York, N.Y., a corporation of New York Application October 8, 1954, Serial No. 461,184

11 Claims. (Cl. 198—19)

This invention relates to conveyors, and more particularly to conveyors for distributing articles to a plurality of work stations.

In conveyor systems in which articles are carried by a main conveyor to a plurality of work stations, it is desirable to supply the stations with the articles in accordance with the demand at each station. It is also desirable to distribute the articles to the stations equally while all stations need the articles and to automatically stop delivery to a filled station and deliver the articles equally to the unfilled stations.

An object of the invention is to provide new and improved conveyors.

Another object of the invention is to provide new and improved conveyors for distributing articles to a plurality of work stations.

A further object of the invention is to provide a conveyor system for distributing articles to a plurality of work stations in accordance with the demand for articles at each station.

A conveyor illustrating certain features of the invention may include a delivery conveyor for moving articles one at a time along a predetermined path from which branch conveyors extend at points spaced therealong. Deflectors are provided at the points and are so actuated that the articles normally are deflected in equal numbers to each of the branch conveyors, while, when one of the branch conveyors does not need more articles, the deflector therefor is rendered inactive and the articles are distributed to the other branch conveyors.

A complete understanding of the invention may be obtained from the following detailed description of a conveyor forming a specific embodiment thereof, when read in conjunction with the appended drawings, in which:

Fig. 1 is a fragmentary top plan view of a conveyor forming one embodiment of the invention;

Fig. 2 is a fragmentary side elevation of the conveyor shown in Fig. 1;

Fig. 3 is an enlarged, fragmentary top plan view of the conveyor shown in Fig. 1;

Fig. 4 is an enlarged fragmentary elevation taken along line 4—4 of Fig. 2, and

Fig. 5 is a diagrammatic view of a control circuit of the conveyor shown in Fig. 1.

Referring now in detail to the drawings, there is shown therein a conveyor for conveying and distributing cardboard cartons or boxes 10 (Figs. 1 and 2) to three work benches 12. The boxes are fed up an inclined belt conveyor 13 from a loading station 15 to an elevated, level belt conveyor 14 extending past chutes 1, 2 and 3, the chutes 1 and 2 having intermittently operable deflecting arms 16 and 17, which may be swung across the conveyor 14 to discharge one of the cartons into their respective chutes as the conveyor 14 advances the carton thereagainst. A stationary deflector 18 is provided at chute 3 to deflect thereto all boxes that come past chute 2. The chutes 1, 2 and 3 have photoelectric level controller relays 23, 22 and 21, each of which is actuated when the cartons in that chute form more than an adequate reserve for the work bench associated therewith. Timers 24, 25 and 26 (Fig. 5) are actuated by the level controllers and provide a time delay which is sufficient to prevent timing out of each of the timers merely by a box or carton falling past one of photoelectric cells 27 of one of the relays 21, 22 or 23 to cut off from the cell a beam of light from a projector 28.

If the chute 3 is filled to an extent having a sufficient reserve of cartons, the cartons cut off the beam of light to the cell 27 of the photoelectric relay 21, the relay 21 closes contacts 31 to close a circuit across a power line 43 to the timer 24, which times out to close contacts 32. Assuming that a switch 33 is in its "on" position, a relay 34 is brought in to close contacts 35, 51 and 81. Whenever chute 2 is completely filled, the relay 22 is similarly actuated to energize a relay 38 to close contacts 39 and 82 and open contacts 53 and 195, and whenever chute 1 is filled, the level control relay 23 through the timer 26 brings in a relay 45, which closes contacts 46 and opens contacts 76 and 79. Thus, whenever all three of the chutes 1, 2 and 3 are filled, the contacts 35, 39 and 46 all are closed to bring in a relay 49, which opens contacts 50. This drops out a relay 60 to stop a motor 61 operating the conveyors 13 and 14 to stop feeding any of the cartons to any of the chutes, and, whenever anyone of the chutes becomes unfilled, the relay 49 will be dropped out to restart the conveyor motor 61.

The conveyor 14 is provided with a phototelectric scanner 101, which sensd a zig-zag beam of light back and forth across the conveyor 14 at a height and position such that any carton approaching chute 2 interrupts the beam of light even though the carton might have a hole that would let a direct beam of light through the carton, such as, for example, a slot in an upstanding lid portion of the carton. The conveyor 14 is similarly provided with a photoelectric scanner 105 located at the approach to chute 1. When photoelectric cells 108 and 109 of photoelectric relays 106 and 107, respectively, of the scanners 101 and 105, respectively, are darkened, the relays permit contactors 40 and 71 to move out of engagement with contacts 41 and 110 and into engagement with contacts 42 and 72. That is, whenever the cell 108 is darkened, the contactor 40 breaks contact with the contact 41, and whenever the cell 109 is darkened, the contactor 71 and the contact 110 open. Whenever the contactor 40 falls away from the contact 41 into engagement with the contact 42, with the chute 2 still calling for cartons, a relay 145 of a ratchet type is deenergized, and, on the next energization of the relay 145 it changes the condition of contacts 146. Assuming the relay 145 closes the contacts 146 after the scanner 101 is cleared, a relay 148 is energized to close contacts 55, 165 and 149 to energize a solenoid 153 to swing the deflector arm 17 at chute 2 across the conveyor 14 to discharge the next carton into chute 2. Then, as that carton comes along and actuates the scanner 101, the contacts 40 and 41 again are broken to drop out the relay 145 to open the contacts 146 when the scanner is cleared and drop out the relay 148 and the solenoid 153 so that the next carton could pass on to chute 3. In other words, with both chute 2 and chute 3 calling for cartons, every other carton that comes to chute 2 is dropped down chute 2 and the others of these cartons travel on to chute 3 and are deflected into chute 3.

If chute 3 is filled so that the level control relay 21 is actuated and the relay 34 is brought in to close contacts 51, a relay 161 is brought in to close holding contacts 162. Whenever the relay 145 closes the contacts 146 to energize the relay 148, the relay 148 closes contacts 55 and 165 to maintain the relay 148 continuously energized even though the scanner 101 is not actuated, and the solenoid 153 remains continuously energized to discharge all cartons coming to chute 2 and permitting none to go on to chute 3.

Normally with either chute 2 or 3 not filled and calling for cartons 10, each carton passing the scanner 105 at chute 1 actuates the photoelectric relay 107 to move the contactor 71 out of engagement with the contact 110 and into engagement with the contact 72, and normally deenergizes the relay 73. Then, as the carton clears the scanner 105, the relay 73 is reenergized and on each third energization of the relay 73 it closes contacts 74 to energize a relay 180 which closes contacts 75 and 78 and also closes contacts 181 to energize a solenoid 182 to swing the deflector arm 16 across the conveyor 14, and the next carton is deflected to chute 1. Then, as this latter carton clears the scanner 105, the photoelectric relay 107 is reactuated to close the contacts 71 and 110 to again energize the relay 73 which again changes the condition of the contacts 74. Hence, the contacts 74 are open while two cartons go past the scanner 105 and are closed on each third carton going past the scanner 105. Thus, with all three chutes calling for cartons, the chute 1 gets every third carton placed on the conveyor. If chute 1 fills up to a point at which the level control 23 is actuated, the relay 45 is actuated to open contacts 76 and 79 to maintain the solenoid 182 deenergized. If chutes 2 and 3 are filled to actuate the level controls 21 and 22, contacts 81 and 82 are closed to bring in a relay 191 which closes contacts 85, 86 and 185. When the contacts 185 are closed, a relay 191 is locked in to lock in the relay 180 and the solenoid 182. Whenever the contacts 74 are closed and the relay 180 is energized, the contacts 78 closing at this time, the solenoid 182 is held in to deflect all the cartons to chute 1.

Assuming that chute 2 is filled and that the portion of the conveyor 14 between chutes 1 and 3 is filled with cartons. Then, when chute 3 becomes filled it actuates the level control 21 to bring in the relay 34, which closes the contacts 51 to lock in the relay 161, and the deflector arm 16 is swung across the conveyor 14 to deflect all further cartons moved along the conveyor 14 from the chute 1. Those cartons on the conveyor 14 between chutes 2 and 3 travel on and are deposited in chute 3. This is effected by the contacts 85 being in parallel with contacts 195 of the relay 38.

The above-described conveyor feeds the cartons 10 in equal numbers to the chutes 1, 2 and 3 when none of the chutes is filled, divides the cartons equally between two unfilled chutes when the third chute is filled, feeds all the cartons to one unfilled chute when the other chutes are filled, and stops entirely when all three chutes are filled. The control system is simple and inexpensive in construction and reliable in operation.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A conveyor system, which comprises a conveyor for conveying articles in one direction along a predetermined path having a first discharge point, a second discharge point spaced along the path in said direction from the first discharge point, and a third discharge point spaced along the path in said direction from the second discharge point, means for pushing articles from the path at the first discharge point, electrical means for actuating the pushing means, sensing means located in advance of said first point responsive to each article moved along said path, ratchet-relay means operable by each three actuations of the sensing means for actuating the article-pushing means, second means for pushing articles from the path at the second discharge point, second electrical means for actuating the second pushing means, second sensing means located in advance of said second point responsive to each article advanced therepast, and second ratchet-relay means responsive to each two actuations of the second sensing means for actuating the second article-pushing means.

2. A conveyor system, which comprises a conveyor for conveying articles in one direction along a predetermined path having a first discharge point and a second discharge point spaced along the path in said direction from the first discharge point, means for pushing articles from the path at the first discharge point, electrical means for actuating the pushing means, sensing means located in advance of said first point responsive to each article moved along said path, and ratchet-relay means operable by a predetermined number of actuations of the sensing means for actuating the article-pushing means.

3. A conveyor system, which comprises a conveyor for conveying articles in a predetermined direction along a predetermined path having a discharge end, an article-receiving station positioned at said discharge end, a second article-receiving station positioned at a point along said path in advance of the first station, a third article-receiving station positioned at a point along said path in advance of the second station, a deflector movable from an inoperative position to an operative position extending across said path to deflect articles from the conveyor to said second station, a second deflector movable from an inoperative position to an operative position extending across said path to deflect articles from the conveyor to said third station, sensing means adjacent to said second station and operable by each article advanced therepast, counting means responsive to each two operations of the sensing means for actuating the first deflector, a second sensing means adjacent to said third station and operable by each article advanced therepast, second counting means responsive to each three operations of the second sensing means for actuating the second deflector, means operable by a filled condition of the second station for rendering the first deflector inoperative, means responsive to a filled condition of the third station for rendering the second deflector inoperative, means operable by a filled condition of the first station for maintaining said first deflector continuously operable, and means operable by filled conditions of the first station and the second station for maintaining said second deflector continuously operable.

4. A conveyor system, which comprises a conveyor for conveying articles in a predetermined direction along a predetermined path having a discharge end, an article-receiving station positioned at said discharge end, a second article-receiving station positioned at a point along said path in advance of the first station, a third article-receiving station positioned at a point along said path in advance of the second station, a deflector movable from an inoperative position to an operative position extending across said path to deflect articles from the conveyor to said second station, a second deflector movable from an inoperative position to an operative position extending across said path to deflect articles from the conveyor to said third station, sensing means adjacent to said second station and operable by each article advanced therepast, counting means responsive to each two operations of the sensing means for actuating the first deflector, a second sensing means adjacent to said third station and operable by each article advanced therepast, and second counting means responsive to each three operations of the second sensing means for actuating the second deflector.

5. A conveyor system, which comprises a conveyor for conveying articles in a predetermined direction along a predetermined path having a discharge end, an article-receiving station positioned at said discharge end, a second article-receiving station positioned at a point along said path in advance of the first station, a third article-receiving station positioned at a point along said path in advance of the second station, a deflector movable from an inoperative position to an operative position extending across said path to deflect articles from the conveyor to said second station, a second deflector movable from an inoperative position to an operative position extending across said path to deflect articles from the conveyor to said third station, sensing means adjacent to said second station and operable by each article advanced therepast, counting means responsive to each two operations of the sensing means for actuating the first deflector, a second sensing means adjacent to said third station and operable by each article advanced therepast, second counting means responsive to each three operations of the second sensing means for actuating the second deflector, means operable by a filled condition of the second station for rendering the first deflector inoperative, means responsive to a filled condition of the third station for rendering the second deflector inoperative, means operable by a filled condition of the first station for maintaining said first deflector continuously operable, means operable by filled conditions of the first station and the second station for maintaining said second deflector continuously operable, and means operable by filled conditions of all the stations for stopping the conveyor.

6. A conveyor system comprising a conveyor, a pair of discharge stations along said conveyor, means associated with each discharge station for transferring an article moving along the conveyor into the associated discharge station, means for normally rendering ineffective said transferring means, means associated with each station for counting the articles passing that station, means actuated by a first counting means counting a predetermined number of articles for rendering effective the transferring means associated with that station to transfer an article into said discharge station, means actuated by a second counting means counting a second predetermined number of articles for rendering effective the transfer means associated with that station to transfer an article into said discharge station, and means actuated by a predetermined number of articles in one of said discharge stations for rendering the associated counting means ineffective to actuate said transfer means and rendering effective said transfer means associated with said other station.

7. A conveyor system, which comprises a plurality of article-receiving stations spaced along a predetermined path, a conveyor for conveying articles along said path, a transfer mechanism located at each of said stations for transferring an article from the conveyor to said station, sensing means located adjacent to each of said stations and operable by each article advanced past the sensing means toward the last station, counting means associated with each sensing means actuatable by a predetermined number of actuations of the associated sensing means, normally unoperated means for varying the number of actuations required to operate the counting means, means connected to each transfer mechanism actuatable by each counting means upon the predetermined number of actuations for moving the transfer mechanism to move an article from the conveyor to the associated article-receiving station, and means operable by an article in a predetermined position in a station for rendering the associated actuating means inoperative and for operating the means for varying the counting means associated with the other stations.

8. A conveyor system, which comprises a plurality of article storage chutes spaced along a predetermined path, a conveyor for conveying articles along said path, a transfer mechanism located at each of said chutes for transferring an article from the conveyor to the respective chute, sensing means located adjacent to each of the said chutes and operable by each article advanced thereto, counting means located at each station actuatable by a predetermined number of operations of the sensing means, means for varying the number of operations required to actuate the counting means, actuating means at each station operated by the actuation of the counting means for actuating the corresponding transfer mechanism, and means operable by a filled condition of any one of said chutes for rendering the transfer mechanism of that chute inoperative and for operating the varying means to vary the predetermined number of operations required to actuate the transfer mechanisms at the other stations.

9. A conveyor system, which comprises a conveyor for conveying articles in a predetermined direction along a predetermined path having a first article-receiving station, a second article-receiving station positioned at a point along said path in advance of the first station, transfer means associated with each station for pushing articles from the conveyor to the associated station, sensing means located at each station operable by each article advanced therepast, means responsive to a predetermined number of operations of the sensing means for operating the associated transfer means momentarily, and means operable by a predetermined filled condition of a station for precluding operation of said associated transfer actuating means and for maintaining said other transfer mechanism operative.

10. A conveyor system which comprises a predetermined number of article-receiving stations, a conveyor for transferring articles through said stations, means for moving the conveyor in a predetermined direction, transfer means at each of said stations for moving an article from the conveyor into the associated station, sensing means located in advance of each station operated by the approach of each article to a station, counting means at each station operated by each operation of the associated sensing means, and means at each station operated by the counting means being operated a number of times equal to the number of stations located beyond a sensing means in the direction of movement of the conveyor for operating the associated transfer means.

11. A conveyor system, which comprises a conveyor for conveying articles along a path, article-receiving stations spaced along the conveyor path, a transfer mechanism located at each of said receiving stations for transferring articles from the conveyor to the station, first sensing means located immediately ahead of each receiving station in the path of the articles actuated by the passage of each article, counting means associated with each first sensing means responsive to a predetermined number of actuations of the sensing means, means actuatable by the counting means upon a predetermined number of actuations of the counting means for actuating the associated transfer mechanism to evenly distribute the articles to the stations, means at each station for varying the predetermnied number of actuations of the counting means required to actuate each transfer mechanism, and a second sensing means in each receiving station operated by the articles filling a station for operating the varying means associated with the other stations to maintain the even distribution of articles to said other stations.

References Cited in the file of this patent

UNITED STATES PATENTS

| | | |
|---|---|---|
| 1,668,529 | Jennings | May 1, 1928 |
| 1,881,514 | Keller et al. | Oct. 11, 1932 |
| 1,882,440 | Naylor | Oct. 11, 1932 |
| 2,470,922 | Dunn | May 24, 1949 |
| 2,632,588 | Hoar | Mar. 24, 1953 |
| 2,728,466 | Postlewaite et al. | Dec. 27, 1955 |